(12) United States Patent
Weatherton

(10) Patent No.: US 8,950,104 B2
(45) Date of Patent: Feb. 10, 2015

(54) ICE FISHING HOLE RETAINING DEVICE

(71) Applicant: Travis Weatherton, Cook, MN (US)

(72) Inventor: Travis Weatherton, Cook, MN (US)

(*) Notice: Subject to any disclaimer, the term of this patent is extended or adjusted under 35 U.S.C. 154(b) by 63 days.

(21) Appl. No.: 13/911,426

(22) Filed: Jun. 6, 2013

(65) Prior Publication Data

US 2014/0360089 A1    Dec. 11, 2014

(51) Int. Cl.
*A01K 69/00* (2006.01)
*A01K 97/01* (2006.01)
*A01K 97/05* (2006.01)

(52) U.S. Cl.
CPC .................. *A01K 97/01* (2013.01); *A01K 97/05* (2013.01)
USPC ......................................... 43/4.5; 43/55; 43/4

(58) Field of Classification Search
USPC ............................. 43/4.5, 55, 4, 56; 126/271.1
See application file for complete search history.

(56) References Cited

U.S. PATENT DOCUMENTS

| | | | | |
|---|---|---|---|---|
| 2,883,784 A * | 4/1959 | Obernolte | ........................... | 43/4 |
| 3,128,758 A * | 4/1964 | Schwabe | .................... | 126/360.1 |
| 3,545,118 A * | 12/1970 | Stelmach | ......................... | 43/17 |
| 4,114,304 A * | 9/1978 | Hedlund | .................... | 126/360.1 |
| 4,253,262 A * | 3/1981 | Johnson | ........................... | 43/17 |
| 4,612,910 A * | 9/1986 | Williams | .................... | 126/350.1 |
| 4,945,668 A * | 8/1990 | Keller | ................................ | 43/17 |
| 4,953,317 A * | 9/1990 | Ruchel | ............................. | 43/17 |
| 6,088,945 A * | 7/2000 | Sanderfoot | ........................ | 43/4 |
| 7,185,456 B1 * | 3/2007 | Schoenecker et al. | ............ | 43/17 |

* cited by examiner

*Primary Examiner* — Christopher P Ellis
(74) *Attorney, Agent, or Firm* — The Law Office of Jerry D. Haynes

(57) ABSTRACT

A hole retaining device to preserve an ice fishing hole comprising a cylinder, where the cylinder extends between an open rim and a closed bottom, and where the cylinder houses a fire ignited to melt ice surround the hole retaining device; a handle attached to the rim, where the handle serves to lift the cylinder; and a bait container attached to the bottom of the cylinder, where the bait container houses bait for ice fishing. The hole retaining device features a tapered cylinder to easily remove the device from the fishing hole.

6 Claims, 1 Drawing Sheet

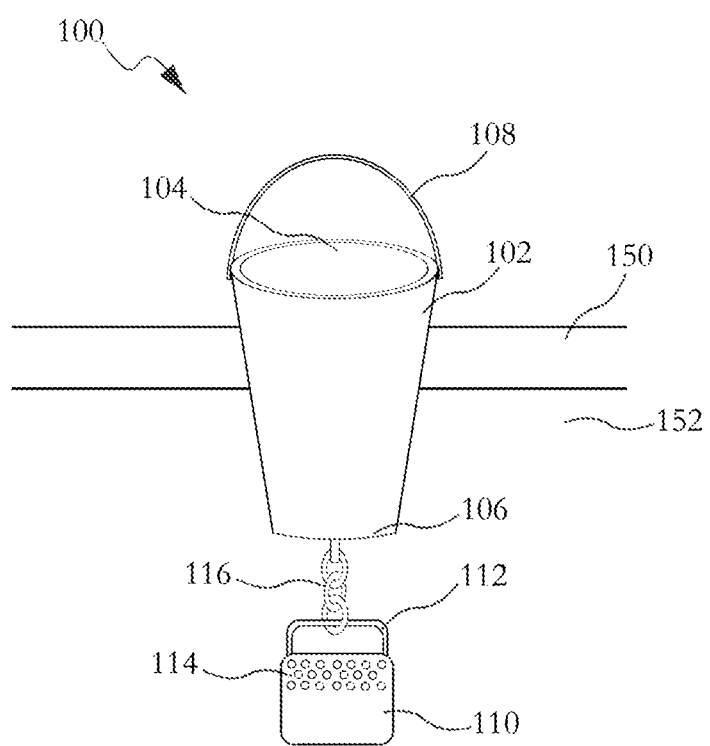

ICE FISHING HOLE RETAINING DEVICE

BACKGROUND OF THE INVENTION

1. Field of the Invention

The present invention relates to a device to assists a user while ice fishing where the device retains a hole in the ice to save time in having to drill new holes during every expedition, and further includes a bait container.

2. Description of Related Art

Fishing is a fun recreational and sporting activity enjoyed by many people. Some prefer to fish for pleasure while others fish for sport. Fishermen have their preferred methods to fish, but a few concepts are common to all; utilizing a hook and a line to snare a fish. Fishing in the summer is particularly enjoyable because the weather is ideal for spending extended periods outdoors. Unfortunately, the winter season brings with it cold weather including snow, ice and freezing temperatures. Fishing is often stopped all together because the water spots where the fish typically live is frozen and the fishermen don't want to brave the elements A few die hard fishermen still endure the inclement weather and ice fish on frozen lakes during the winter months. They often fish within huts or tents on the solid ice, over drilled holes that allow access to the underlying water and fish. Many times the fishermen require heaters inserted into the fishing holes to maintain the hole. Without the heaters the ice refreezes and closes access to the fish. Also, without some sort of hole retainer, a new hole must be drilled every time the fisherman returns to fish causing extra time and effort spent in preparation instead of fishing.

It would be desirable in the art to provide an ice fishing hole preservation device to maintain a fishing hole while the user is away. It would also be beneficial in the art for the hole preservation device to be able to be heated for easy insert and extraction after use.

SUMMARY OF THE INVENTION

In view of the foregoing disadvantages inherent in the prior art, the general purpose of the present invention is to provide a hole retaining device to preserve a fishing hole, configured to include all of the advantages of the prior art, and to overcome the drawbacks inherent therein.

Accordingly, an object of the present invention is to provide a hole retaining device for ice fishing where the device includes a bucket to maintain the hole while the fisherman is away.

Another object of the present invention is to provide a hole retaining device for ice fishing that includes an attached bait container that remains in the water to store bait and bait fish.

To achieve the above objects, in an aspect of the present invention, a hole retaining device is described comprising a cylinder, where the cylinder extends between an open rim and a closed bottom, and where the cylinder houses a fire ignited to melt ice surround the hole retaining device; a handle attached to the rim, where the handle serves to lift the cylinder; and a bait container attached to the bottom of the cylinder, where the bait container houses bait for ice fishing. The hole retaining device features a tapered cylinder to easily remove the device from the fishing hole.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing and in which:

FIG. 1 depicts a perspective view of an ice fishing hole retaining device in accordance with an exemplary embodiment of the present invention.

DETAILED DESCRIPTION OF THE DRAWINGS

The present invention relates to a device to assists a user while ice fishing where the device retains a hole in the ice to save time in having to drill new holes during every expedition, and further includes a bait container. The present invention provides an ice fishing hole retaining device to preserve drilled holes created for ice fishing, in order to save time and effort on future sessions. The ice fishing hole retaining device includes a tapered bucket which serves as a fire pit in the ice. By igniting a fire in the bucket the ice surrounding the device thaws to allow extraction of the bucket for use as a fishing hole. Additionally, the ice fishing hole retaining device includes a bait container that hangs from below the bucket to house bait and minnow fish in the water for retrieval as needed by the fisherman.

Turning now descriptively to the drawings, referring to FIG. 1, a perspective view of the ice fishing hole retaining device 100 in accordance with an exemplary embodiment of the present invention. The ice fishing hole retaining device 100 includes a cylinder 102 that extends between an open rim 104 and a closed bottom 106. The cylinder 102 may measure 8-10 inches in diameter at the rim 104, 6-8 inches in diameter at the bottom 106, and 24-36 inches in height. The rim 104 includes a handle 108 to lift and transport the cylinder 102 as needed.

The cylinder 102 may comprise a tapered body where the rim 104 is wider than the bottom 106. This way the cylinder 102 is easily extracted from the surrounding ice 150 after melting. During use, the user may place the cylinder 102 into the hole to freeze the cylinder 102 in place, thereby preserving the fishing hole. To remove the cylinder 102 the user ignites a fire within the cylinder 102 to melt the surrounding ice 150, then the hole may be used again for fishing. The cylinder 102 may be made from steel or aluminum to withstand the high temperatures of the flames, and to be a strong heat conductor to melt the surrounding ice 150.

Attached to the bottom 106 may be a bait container 110. The bait container 110 houses bait and small fish in the water 152 below the ice 152. The bait container 110 may include a handle 112 to attach the bait container 110 to the bottom 106 of the cylinder 102. Between the handle 112 and the cylinder bottom 106 may be a chain 116. The chain 116 allows the bait container 110 to hang below the cylinder 102 a safe distance from the heated bottom 106. This prevents the internal bait within the container 110 from overheating, cooking and ruining before use. The bait container 110 may include a plurality of holes 114 to allow water 152 to freely flow in and out of the container 110.

The ice fishing hole retaining device 100 easily preserves the hole created while ice fishing. After the fishing hole is drilled, the cylinder 102 of the ice fishing hole retaining device 100 is situated within the hole to freeze into place, thereby preserving the hole. In order to remove the cylinder 102 when ready to fish again, the user simply needs to fill the cylinder 102 with a flammable material, like newspaper or wood chips, which is then set on fire, effectively heating the inside surface and thawing the ice for quick and easy removal. The ice fishing hole retaining device 100 uniquely includes a bait container 110 which hangs from the bottom 106 to hold fresh bait and minnow fish. With the ice fishing hole retaining device 100 the user is afforded a hole preservation device along with a bait holder as a convenient fishing tool while enjoying a favorite activity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A hole retaining device to preserve an ice fishing hole comprising:

a. a cylinder, where the cylinder extends between an open rim and a closed bottom, and where the cylinder houses a fire ignited to melt ice surround the hole retaining device;
   b. a handle attached to the rim, where the handle serves to lift the cylinder; and
   c. a bait container attached to the bottom of the cylinder, where the bait container houses bait for ice fishing.

2. The hole retaining device according to claim 1, where the cylinder is tapered causing the rim to be wider than the bottom.

3. The hole retaining device according to claim 1, where the cylinder is made from metal to withstand the high temperature of the internal fire.

4. The hole retaining device according to claim 1, where the bait container is attached to the bottom of the cylinder with a chain.

5. The hole retaining device according to claim 4, where the bait container includes a handle which is fastened to the chain.

6. The hole retaining device according to claim 1, where the bait container includes a plurality of holes, where the plurality of hole enable water to freely flow through the bait container.

\* \* \* \* \*